US011829506B2

(12) United States Patent
Reisgies

(10) Patent No.: US 11,829,506 B2
(45) Date of Patent: Nov. 28, 2023

(54) SYSTEM AND METHOD FOR GENERATION, STORAGE, ADMINISTRATION AND USE OF ONE OR MORE DIGITAL SECRETS IN ASSOCIATION WITH A PORTABLE ELECTRONIC DEVICE

(71) Applicant: TIS Inc., Tokyo (JP)

(72) Inventor: Hans Reisgies, San Jose, CA (US)

(73) Assignee: TIS INC., Tokyo (JP)

( * ) Notice: Subject to any disclaimer, the term of this patent is extended or adjusted under 35 U.S.C. 154(b) by 178 days.

(21) Appl. No.: 15/488,276

(22) Filed: Apr. 14, 2017

(65) Prior Publication Data

US 2017/0300716 A1 Oct. 19, 2017

Related U.S. Application Data

(60) Provisional application No. 62/322,288, filed on Apr. 14, 2016.

(51) Int. Cl.
*G06F 21/62* (2013.01)
*G06F 21/60* (2013.01)
(Continued)

(52) U.S. Cl.
CPC .......... *G06F 21/6245* (2013.01); *G06F 21/45* (2013.01); *G06F 21/606* (2013.01);
(Continued)

(58) Field of Classification Search
CPC .................................................. G06F 21/6245
See application file for complete search history.

(56) References Cited

U.S. PATENT DOCUMENTS 5,604,801 A 2/1997 Dolan et al.
6,510,519 B2 * 1/2003 Wasilewski ........... H04L 63/045
713/168
(Continued)

FOREIGN PATENT DOCUMENTS

CN 1949196 A 4/2007
CN 101755291 A 6/2010
(Continued)

OTHER PUBLICATIONS

NPL Search Terms (Year: 2022).*
(Continued)

*Primary Examiner* — Syed A Zaidi
(74) *Attorney, Agent, or Firm* — WOMBLE BOND DICKINSON (US) LLP

(57) ABSTRACT

A system for generation, storage, administration and use of one or more digital secrets in association with a portable electronic device. The system comprises a highly secured memory that stores only one or more master keys; a keystore implemented in the portable electronic device outside of the highly secured memory; one or more cryptography applets implemented in the portable electronic device outside of the highly secured memory; and a highly trusted intermediary module (ThIM) implemented outside of the highly secured memory, the ThIM establishes and manages a highly trusted communication conduit between the highly secured memory, the keystore, the one or more cryptography applets, and at least one third party application, wherein the ThIM polls the portable electronic device, the highly secured memory, the keystore, the one or more cryptography applets to determine a trust score, initialization cost, and transaction cost for each component in the portable electronic device, the ThIM providing a trusted third party application acceptable interaction parameters based on the trust score, the initialization cost, and the transaction cost, the ThIM man- (Continued)

aging highly trusted communications between the trusted third party application and the highly secured memory in accordance with the acceptable interaction parameters.

7 Claims, 2 Drawing Sheets

(51) Int. Cl.
 *G06F 21/45* (2013.01)
 *G06F 21/72* (2013.01)
 *H04L 9/08* (2006.01)

(52) U.S. Cl.
 CPC .......... *G06F 21/6209* (2013.01); *G06F 21/72* (2013.01); *H04L 9/0897* (2013.01); *H04L 2209/805* (2013.01)

(56) References Cited

U.S. PATENT DOCUMENTS

| | | | |
|---|---|---|---|
| 6,986,052 B1 | 1/2006 | Mittal | |
| 7,181,017 B1 | 2/2007 | Nagel et al. | |
| 8,578,348 B2* | 11/2013 | Fliess | G06F 11/3428 717/135 |
| 8,850,200 B1 | 9/2014 | Horgan | |
| 9,015,066 B2* | 4/2015 | Scipioni | G06Q 20/387 705/21 |
| 9,317,704 B2 | 4/2016 | Brudnicki et al. | |
| 9,607,293 B2* | 3/2017 | McMillen | G06Q 20/229 |
| 9,774,448 B2* | 9/2017 | Oberheide | H04L 9/0869 |
| 2003/0221104 A1 | 11/2003 | Baessler | |
| 2006/0126422 A1 | 6/2006 | Takagi et al. | |
| 2008/0114958 A1* | 5/2008 | Jogand-Coulomb | G06F 21/10 711/164 |
| 2008/0215474 A1* | 9/2008 | Graham | G06Q 10/10 705/37 |
| 2009/0234751 A1* | 9/2009 | Chan | G06Q 40/00 705/26.1 |
| 2011/0154497 A1* | 6/2011 | Bailey, Jr. | H04L 63/0861 726/25 |
| 2011/0289294 A1 | 11/2011 | Maeda et al. | |
| 2011/0296440 A1 | 12/2011 | Laurich et al. | |
| 2012/0123868 A1 | 5/2012 | Brudnicki et al. | |
| 2012/0159612 A1* | 6/2012 | Reisgies | G06F 21/41 726/18 |
| 2013/0007467 A1* | 1/2013 | Chan | G06F 21/10 713/189 |
| 2013/0152180 A1* | 6/2013 | Nair | G06F 21/10 726/26 |
| 2013/0266137 A1 | 10/2013 | Blankenbeckler et al. | |
| 2014/0007222 A1* | 1/2014 | Qureshi | H04L 67/10 726/16 |
| 2014/0040139 A1* | 2/2014 | Brudnicki | H04W 12/068 705/44 |
| 2014/0059357 A1* | 2/2014 | Andersson | G06F 21/602 713/189 |
| 2014/0143137 A1 | 5/2014 | Carlson | |
| 2014/0145823 A1* | 5/2014 | Aase | H04W 4/80 340/5.61 |
| 2014/0173284 A1* | 6/2014 | Ganesan | H04L 9/3247 713/171 |
| 2014/0210589 A1* | 7/2014 | Grace | G06F 21/32 340/5.51 |
| 2015/0089573 A1 | 3/2015 | Fujii et al. | |
| 2015/0326545 A1 | 11/2015 | Khan | |
| 2016/0057619 A1* | 2/2016 | Lopez | H04W 12/041 380/247 |

FOREIGN PATENT DOCUMENTS

| | | |
|---|---|---|
| JP | 2004199138 A | 7/2004 |
| JP | 2015064694 A | 4/2015 |
| JP | 2015532499 A | 11/2015 |
| WO | WO 2003/084175 | 10/2003 |
| WO | 2009013700 A2 | 1/2009 |
| WO | 2011074168 A1 | 4/2013 |
| WO | 2014063133 A1 | 4/2014 |

OTHER PUBLICATIONS

NPL Search Terms (Year: 2023).*
International Search Report and Written Opinion regarding PCT App. No. PCT/US17/27749.

* cited by examiner

SYSTEM AND METHOD FOR GENERATION, STORAGE, ADMINISTRATION AND USE OF ONE OR MORE DIGITAL SECRETS IN ASSOCIATION WITH A PORTABLE ELECTRONIC DEVICE

CROSS-REFERENCE TO RELATED APPLICATIONS

This application claims priority to U.S. Provisional Application Ser. No. 62/322,288 filed on Apr. 14, 2016, the entire contents of which are hereby expressly incorporated herein by reference.

TECHNICAL FIELD

The present invention relates generally to the protection and use of digital secrets, and more particularly to a system and method for providing secure data communication functionality to a variety of applications on a portable communication device.

BACKGROUND

Electronic control points are widely used. Electronic control points are devices that operably receive electronic credentials and subsequently act in response to the receipt of such electronic credential by accepting payment, providing access, combinations thereof and other responses. For example, a point of sale device is one type of electronic control point. The point of sale terminal operably receives an electronic payment credential, transmits the electronic payment credential and other transaction identifying information to an issuer, receives a message from the issuer indicating whether the financial transaction is authorized or declined, and where authorized accepts the electronic payment in exchange for the goods or services sought by the consumer holding the electronic credential.

There are many types of electronic control points including, but not limited to, point of sale terminals/devices, automatic teller machines (ATM), toll gates, electronic door/ignition locks (in workplaces, hotels and other lodging, and in and on vehicles), safe deposit boxes, turnstiles (at, for instance, transit stations, amusement facilities, concert, sports, and other entertainment venues), parking garage access gates, vending machines, and even to manage loyalty program processing. It is also contemplated that the electronic control point may only read the electronic credential and provide information to a person who in turn grants or denies access. One example of such an arrangement is well known in airports; where a security agent places an electronic credential on an optical reader that reads a code (i.e. an electronic credential), subsequently provides human-intelligible information regarding the electronic data read, which is then used by the human agent to determine search parameters and overall access to an airport.

Wireless presentation of electronic credentials using RFID-based proximity cards is well-known. For instance, workers use RFID keycards to gain access to their workplace via an electronic door lock. Drivers use RFID passes to pay tolls at highway speeds (another type of electronic control point). RFID, which stands for radio-frequency identification, uses electromagnetic waves to exchange data between the electronic control point and an object (e.g. electronic keycard) for the purpose of identification.

One particular type of RFID is called Near Field Communication (NFC). NFC waves transmit only over short-range (on the order of a few centimeters) and at high-frequencies. NFC enabled devices are already used to make payments at point of sale terminals and to provide access control. NFC is an open standard (see, e.g. ISO/IEC 18092) that specifies modulation schemes, coding, transfer speeds and the RF interface. NFC provides better security than generalized RFID for the presentation of electronic credentials. This improved security is particularly desirable in financial transactions and for many types of access control.

Consequently it has become increasing common for portable electronic devices such as smart cards, smart phones, smart watches, key fobs, fitness trackers, personal computers, and other mobile devices to include one or more short proximity electromagnetic communication transmitters (or more preferably transceivers) for the purpose of emulating an electronic credential.

In addition to the one or more short proximity electromagnetic communication transmitter/transceivers, nearly all portable electronic devices (and especially the types set forth in the prior paragraph) include at least a microprocessor and memory. The memory may include ROM, RAM as well as one or more removable memory cards. The mass memory provides storage for computer readable instructions and other data, including a basic input/output system ("BIOS") and an operating system for controlling the operation of the portable electronic device. Many of these portable electronic device further include a user interface that provides means for the consumer to receive information and, in turn, input information or otherwise respond to the received information. As is presently understood (without intending to limit the present disclosure thereto) this user interface may include one or more of the following: a microphone, an audio speaker, a haptic interface, a graphical display, a keypad, a keyboard, a pointing device and/or a touch screen.

These portable electronic devices also frequently have or are otherwise able to operably connect to one or more networks. One such network may be provided to the portable electronic devices by a mobile network operator (commonly referred to as MNOs). Mobile network operators usually provide voice and data transmission and reception capabilities between the mobile network and mobile network operator using one or more technologies, such as global system for mobile communication (GSM), 3G, 4G; 4G LTE, code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Many of these portable electronic devices also have the ability to download and execute consumer-facing applications.

Some portable electronic devices may also include one or more location determining devices that can determine the physical coordinates of the portable electronic device on the surface of the Earth (typically as a function of its latitude, longitude and altitude). This location determining devices most often rely on GPS technology to determine position of the device so such devices may interchangeably be referred to herein as a GPS transceiver; however, it should be understood that the location receiver can additionally (or alternatively) employ other geo-positioning mechanisms, including, but not limited to, triangulation, assisted GPS (AGPS), E-OTD, CI, SAI, ETA, BSS or the like, to determine the physical location of the portable electronic device on the surface of the Earth.

Many portable electronic devices, especially portable electronic communication devices include memory dedicated to identify the device. For instance, in smart phones the device identification memory is frequently a SIM card. As is generally understood, those SIM cards would contain the unique serial number of the device (ESN), an internationally unique number of the mobile user (IMSI), security authentication and ciphering information, temporary information related to the local network, a list of the services the user has access to and two passwords (PIN for usual use and PUK for unlocking). As would be understood in the art by those having the present specification, figures, and claims before them, other information may be maintained in the device identification memory depending upon the type of device, its primary network type, home mobile network operator, etc.

Using an electronic credential in association with a portable electronic device frequently involves security concerns. If a thief is able to obtain a copy of the electronic credential any resulting misuse of that purloined credential would be problematic not only for the intended credential end user, but also the credential issuer and a host of third parties, such as the merchants, property managers, and others who relied on secure electronic credentials to grant the holder of the electronic credential access. The most basic solution for securing these electronic credentials is to obscure their actual values using cryptographic methods.

Cryptography generally describes a variety of methods, called encryption, for scrambling plain content (e.g. text) into obscured content such that the original content can later be recovered by another who knows how to decrypt the obscured information back into its plain content. Decryption almost always requires knowledge of both the method used for encrypting (i.e. obscuring) the data, as well as the data used by the encryption method to vary the obscurity. This variable data is often called an encryption key. So, imagine you were a scout behind enemy lines and wanted to get a message back to the Commander. If you had planned ahead for the possibility you and the Commander could have decided to obscure your messages by evenly shifting letters forward or backward by a certain number of positions. In this simple example whether you decided to shift backwards or forwards would be the encryption method and the number of positions could be thought of as the encryption key. To follow this example if you decided to uniformly shift forward two letters then your cryptographic method would tell you to write a "C" anytime you wanted to convey an "A" and a "D" when you wanted to convey a "B" because the recipient of your message would know to decrypt your message by shifting backward two spaces. As you would suspect, this form of simple encryption would be relatively easy to break once your enemy had obtained enough encrypted material to search for patterns. Modern day encryption is far more complex often requiring a computer (if not supercomputer) to encrypt and decrypt data. However, the basic concepts are still the same, i.e. there is a cryptographic method, a cryptographic key, and plain content that is converted into cryptic text.

When smart phones arrived on the scene, it was understood that secure messaging would be desired. That security was initially provided in conjunction with a secure element (SE). Today, the GlobalPlatform standard defines the configuration and management of SEs. In particular, it defines a secure element (SE) as a temper-resistant microcontroller (typically a single chip) that securely hosts confidential electronic credentials (i.e. confidential and cryptographic data) used by applications (or applets) also stored locally and securely to the SE. In turn, the SE provides a secure environment in which the applets can operate securely in association with the confidential and cryptographic data while preventing those electronic credentials stored inside from becoming visible to the outside. The SE further controls interactions between applications stored on the SE, trusted sources, and third parties (such as merchants, property managers, and transit agencies). SEs can have different form factors: Universal Integrated Circuit Card (UICC), embedded SE and microSD. Presently, there are at least a few companies producing secure elements that comply with the GlobalPlatform standard. Needless to say some manufacturers are better than others. In addition, some SE manufacturers produce SEs that exceed the minimum requirements of the standard and others do not. Because SEs are difficult to work with and their cryptographic applets are often loaded onto SEs during the manufacturing process, SEs frequently contain older versions of applets.

Thus, SEs provide hard-rooted trust and a blackbox within which various cryptographic methods (i.e. applets) operate. This hard-rooted trust and blackbox environment is ideal for securing and using electronic credentials and other digital secrets in mobile devices. However, this model is exceedingly difficult to operate in real life, especially to the scale currently contemplated. The complexities in provisioning and subsequently managing both the electronic credentials and the applets stored on a SE have proven to be a formidable barrier to wide-spread adoption of this TSM (or Trusted Service Manager) model. In this model, the TSM is a neutral party that transfers technical information behind the scenes between SE manufacturers, portable electronic device manufacturers, mobile network operators, end users, and third parties (e.g. issuers and merchants). To illustrate part of this complexity, the TSM obtains the identification number for each secure element from its manufacturer and then tracks the insertion of each SE into a particular portable electronic device. Each portable electronic device has some identifier akin to an IMEI ("International Mobile Station Equipment Identity"—a unique number used by the MNO networks (usually GSM, UMTS, LTE and iDEN) to identify valid mobile devices) or other identifying number of the electronic portable device.

Thus, in this system, the TSM was made responsible for maintaining a database equating identification number of each SE ("SEid") with each portable device within which the SE is stored. The TSM are also responsible for issuing, managing, and tracking the trusted execution environment in the SE, assigning areas with the trusted execution environment to various services, managing the keys for the trusted execution environment, securely downloading applications to portable electronic devices containing SEs, locking, unlocking, deleting applications based on requests from a variety of stakeholders. Provision of these services in association with a variety of device and SE manufacturers, a plurality of MNO's, dozens of other interested third parties, and end users creates an inventory and logistical nightmare.

The complexities of the Trusted Service Manager model as well as the added hardware expense of having an SE (and the decision of some handset manufacturers not to deploy SEs) led to the development of an alternative solution called host card emulation (HCE). HCE is a type of cloud-based offering that provides virtual representations of electronic credentials without the use of a Secure Element. In fact, HCE was initially thought of as being equivalent to having a secure element in the cloud. In the initial HCE approach, the backend (i.e. the cloud) stored the electronic credentials (i.e. the confidential and cryptographic data) as well as the cryptographic applets used to generate the other electronic credentials (often referred to as tokens), which provided authorization for electronic control points. In first-generation HCE, the electronic credentials (or tokens) were passed from the cloud/backend to the portable electronic devices via a secure communication channel. In this manner, first-generation HCE still provided a blackbox environment (i.e. the backend in the cloud) within which the cryptographic applets could more securely operate. But this approach required backend operations supported by companies referred to as Token Service Providers (TSPs). The TSPs serve a similar role to that of the TSMs with respect to SEs, but among the other potential advantages of TSPs to TSMs, TSPs do not have to track relationships between physical assets (i.e. SE to handset).

At some point in the development of HCE the approach changed to providing the cryptographic processes—previously stored and operated within secure elements or in a secured cloud—on the portable electronic device, itself, usually in its operating system. This shift removed the need for TMs but also practically removed the protection of a blackbox that had previously obscured the cryptographic processes from view. This left the cryptographic processes and their associated keys more readily available to hackers for study, which allowed them the opportunity to design attacks.

In both generations of HCE, whichever service layers are deployed on the portable communication device may be downloaded directly from an online application store directly into the device to provide a local application that communicates directly with an electronic control point to validate a transaction without having to go through a secure element/TSM.

Where a cryptographic process is deployed and operates in the open, people of ordinary skill in electronic security refer to this type of deployment as being "whitebox" (i.e. the opposite of a blackbox (i.e. a system where you can only see the output generated based on a given input).

Most second generation HCE deployments use some form of whitebox cryptography. Whitebox cryptography prevents the exposure of confidential information including the cryptographic keys by obfuscating the keys in data and code, often times randomizing the data and even the composition of the code. So, even though the cryptographic algorithms used in whitebox cryptography are still often openly observable, the cryptographic keys are not readily observable. However, the various providers of whitebox cryptography solutions provide varying implementations with some being more secure, e.g. better at obscuring the keys, and some being more efficient than others.

The second generation HCE model has been implemented in the Android Operating System since Android version 4.4. In particular, the Android Keystore stores cryptographic keys in a virtual container within the portable communication device. Once the crypto keys are in the Keystore they can be used for cryptographic operations, but they can never be removed. Keystore also limits applications on the device to using the stored crypto keys for specifically authorized uses. These restrictions provide some additional security for the digital secrets being protected, but they are only as secure as the applications that are allowed to access the Android Keystore. As a result, applications, themselves, may compromise the security of the device and process. In fact, it is already a known problem with Android Keystore that a hacker may be able to direct use, manipulate and even see an application's keys via manipulation of the application, even if that hacker was unable to directly access the stored key values.

While the HCE model requires much less management complexity than the TSM and tokenization models, it is not nearly as secure as those models. Thus, the HCE model leaves MNO's, providers, end users and third parties more vulnerable to security breaches and/or attacks.

One potential prior art solution to concerns to both TSM and HCE is the trusted execution environment (or TEE). In a TEE system, an isolated execution environment is provided within a microprocessor of the portable electronic device using hardware and software solutions, such that integrity of any applets and electronic credentials (i.e. confidential and cryptographic data) stored within the TEE is better secured than in the HCE environment. Moreover, while electronic credentials may be temporarily exposed while they are passed into a TEE system, they are not left open as found in the whitebox environment (e.g. second generation HCE). As such, TEE offers an intermediate level of security that is adequate for many electronic credentials and electronic control point applications. However, problems—in addition to its added hardware cost—still exist with the TEE model, such as the obsolescence of applets and problems with securely moving data into the TEE.

In addition to electronic payment and other types of secure credentials, there are still other digital secrets that could benefit from the availability of secured generation, storage, administration, and use in an otherwise whitebox environment. For example, usernames, passwords/PINs, digital certifications, digital key sets, biometric data files, and other sensitive data would be additional types of digital secrets that would benefit from the availability of improved device security mechanisms.

Thus far, solutions that have been adopted in an attempt to simplify and expand the trusted credential infrastructure have thus far failed to provide the desired high security with much needed practicality for coordination, distribution, and maintenance of the system.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

The disclosure relates to a system for generation, storage, administration and use of one or more digital secrets in association with a portable electronic device. The system comprises a highly secured memory in the portable electronic device that stores only one or more master keys; a keystore implemented in the portable electronic device outside of the highly secured memory and one or more cryptography applets implemented in the portable electronic device outside of the highly secured memory.

The system further comprises a highly trusted intermediary module (ThIM) that is implemented outside of the highly secured memory. The ThIM establishes and manages a highly trusted communication conduit between the highly secured memory, the keystore, the one or more cryptography applets, and at least one third party application. The ThIM polls the portable electronic device, the highly secured memory, the keystore, the one or more cryptography applets to determine a trust score, initialization cost, and transaction cost for each component in the portable electronic device. The ThIM further provides trusted third party applications acceptable interaction parameters based on the trust score, the initialization cost, and the transaction cost of the various components of the portable electronic device. The ThIM also manages the highly trusted communications between the trusted third party application and the highly secured memory in accordance with the acceptable interaction parameters.

These and other aspects of the disclosure will be more fully explained below.

BRIEF DESCRIPTION OF THE DRAWINGS

For a better understanding of the present disclosure, non-limiting and non-exhaustive embodiments are described in reference to the following drawings. In the drawings, like reference numerals refer to like parts through all the various figures unless otherwise specified.

DISCUSSION OF THE DISCLOSURE

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The present disclosure provides a system and method for providing generation, storage, administration and use of sensitive credentials when protected by one or more advanced security components in association with a portable electronic device. The present invention also provides systems and processes for third parties to manage the risk of using their digital secrets with any particular portable electronic device.

Figure 1:
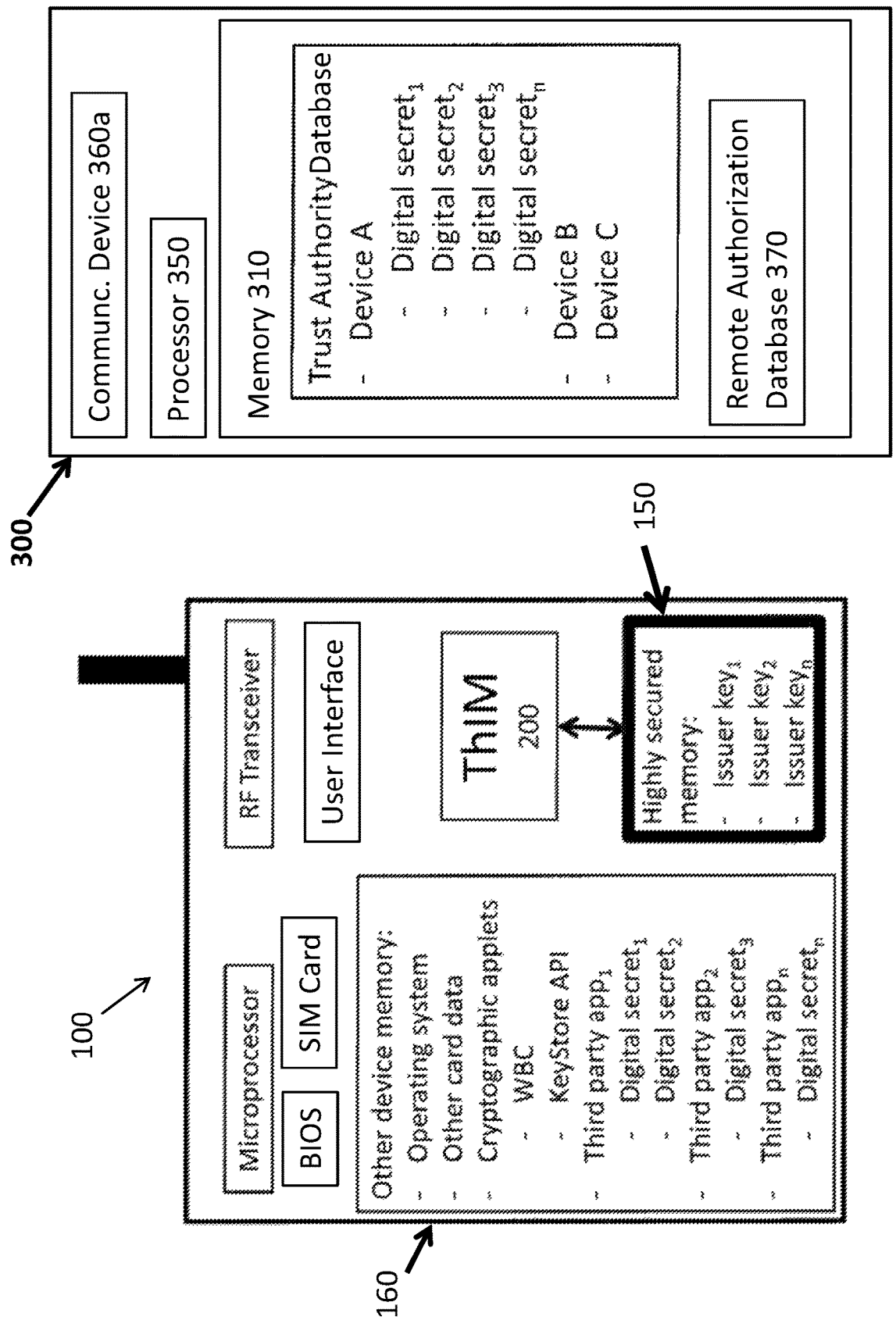
FIG. 1 is a schematic plan view of a portable electronic device 100 and the trusted authority server 300, showing the highly trusted intermediary module (ThIM) that controls all communication with the highly secured memory 150 of the portable electronic device 100.

As shown in FIG. 1, the portable electronic device 100 preferably has a highly secured memory 150. Highly secured memory 150 may be a physical secure element (SE) or at least a microprocessor with a TEE. While original TSM systems stored the confidential and cryptographic data used by the applications as well as the cryptographic applications (or applets) themselves, the present invention stores only the most secretive part in the highly secured memory: the one or more issuer keys. In turn, the applets and any other card data are stored elsewhere in the memory associated with the portable electronic device 100. Because only the issuer (or master) keys are stored in the highly secured memory 150, the highly secured memories may be smaller than the memories of SEs and TEEs that have been more recently deployed. Especially with respect to SEs that use flash memory hardware for their highly secured memories, the reduction in the size of the highly secured memory 150 should result in a significant cost savings to portable device manufacturers implementing the present invention. Conversely, secure elements could now be pre-configured with thousands of available, unassigned keysets during the IC manufacturing process. In post manufacturing and deployment of mobile communication devices with these high secured memories, pre-saved, unassigned keysets can be readily assigned to issuers enabling rapid adoption of new services.

The offloading of the applets and non-issuer key data into the other device memory 160 already simplifies the effort and overhead that was required of TSM's to manage the SE's in the trusted service model. Moreover, storage of the secret keys in an SE (or TEE) is significantly more secure than merely storing these highly confidential pieces of information in the open on the memory of the portable electronic device 100. Furthermore, moving the keys back to secure real estate (i.e. SE or TEE) on the portable communication device simplifies the calculations that needed to be done in the backend (or cloud) on a regular basis depending upon the frequencies of usage of the portable communication device for interaction with electronic control points. Furthermore, moving the secret keys back to highly secure real estate (i.e. highly secured memory 150) in the portable communication device 100 and the applets and other card data elsewhere on the portable communication device, itself, means the system backend no longer needs to be a token service provider. Now, the backend providers merely need to play the role of "Trust Authority" or "Certificate Authority" or "Key Management Authority" or "Key Management Service." In this role, the backend non-volatile memory 310 is still responsible for storing digital secrets in the cloud to check against the keys generated and transferred by the portable communication device 100, as such, to the electronic control point 50 when a user desires to activate or otherwise interact with the secure electronic control point and then onto the Trust Authority's system 300. But, the Trust Authority system 300—which includes non-volatile memory 310, processor 350 and two or more communication devices (e.g. 360a and 360b)—no longer acts as a token vault continually generating and issuing tokens to requesting portable communication devices.

While these more secured keys could theoretically be accessed by Android Key Store (or other third party cryptographic programs) simply to take advantage of the large and growing library of APIs that interface with the Android Key Store, it is well known that Android Key Store may be easily broken and rooted. And while storing the keys in the highly secure SE vastly improves security over second-generation HCE and even TEE solutions, the present invention seeks to allow the storage of the previously well secured cryptographic applets and other card data in the relatively unsecured device's memory to provide advantages to updating applets and other card data.

However, using an exposed applet to access highly secured memory 150 (e.g. a SE or a TEE) to obtain the secret key would provide an easily exploitable security weakness. Thus, rather than allowing direct access to the highly secure memory 150 from the unsecured applets, the present invention provides a highly trusted intermediary (ThIM 200) to communicate between the unsecured cryptographic applets in other device memory 160 and the highly secured memory 150. This highly trusted intermediary may be, for example, a software program or other computer readable instructions stored on a non-transitory computer readable medium (e.g., memory, RAM, ROM, etc.), that transforms a computer processor into a particular electronic interface responsible for establishing, maintaining, and managing a highly trusted communication conduit between the highly secured memory 150 (e.g. of an SE or even a TEE) and other functional modules running on the same portable communication device 100. The instructions of the trusted intermediary module (ThIM 200), when executed by at least one processor associated with the portable communication device, may cause the device to perform the operations described herein. It is also contemplated that ThIM 200 could be implemented by a primarily physical component design with a minimal amount of memory (perhaps even just one or more storage registers).

Trustworthiness of the highly trusted intermediary module ("ThIM") should be confirmed, for example, when ThIM 200 is used by the portable communication device 100 for the first time, when any software internal to the ThIM 200 is updated, when a predetermined amount of time has elapsed since last confirming trustworthiness of the ThIM 200, when any cryptographic applet attempts to utilize data stored in the highly secured memory 150, and/or each time a third party application attempts to utilize data stored in the highly secured memory 150. Trust provisioning may also be used to prevent rogue ThIMs or applications from obtaining access to the secure element or TEE. (Rogue ThIMs may theoretically be obtained from any number of places, including via download from a legitimate application store. Hackers may also design rogue ThIMs that mimic the look, feel and/or operation of the real ThIM.)

Each ThIM 200 and then each of the cryptographic applets in other device memory 160 may each undergo a registration process to establish their respective trustworthiness within the system prior to accessing or otherwise managing the keys (e.g. reading, writing, deleting data) stored in the highly secure memory 150. To establish that trust, the ThIM 200 may attempt to register with the backend system 300 (a/k/a Trust Authority system), which would preferably include at least one processor 350 and at least one memory 310 (or non-transitory computer readable media) storing computer readable instructions. The instructions, when executed, may cause a processor 350 to perform the functions described herein. Once registration of ThIM 200 with the backend system 300 is successful, the ThIM 200 may then attempt to register one or more applets via the Trust Authority system 300. Once an applet is successfully registered with a registered ThIM 200, the ThIM may then permit that registered applet to access and otherwise inquire about the keys stored in highly secure memory 150.

One method for establishing trust between ThIM 200 and the Trust Authority system 300 may be found in pending U.S. patent application Ser. No. 13/916,307 entitled "System and Method For Initially Establishing And Periodically Confirming Trust In A Software Application" filed On Jun. 12, 2013, which is hereby incorporated by reference. Once the trust of the ThIM 200 in portable electronic device 100 is established, ThIM 200 may then be used to validate the cryptographic applets on portable electronic device 100 to secure the credential system and once the applets are validated then they may be allowed to communicate with the highly secured memory 150 via ThIM 200.

Verifying the trusted status of an applet may involve accessing a local authorization database of permitted or trusted applications. In a preferred approach, the local authorization database in cooperates with a remote authorization database 370 operably associated with one or more servers associated with the Trust Authority system 300. Thus, database 370 is likely to be maintained on a device by device basis on the server side. As would be understood by those of ordinary skill in the art having the present specification before them, the database 370 may be implemented in separate physical databases or one unified database. The database 370 may include information related to or otherwise regarding the applets that have been approved by the secure system provider. This applet information may range from an entire verbatim copy of an applet to just the identifying information of the approved version of an applet, and combinations thereof. The databases may include, among other information, an Application ID, an Issuer ID, and a Compile ID or token. The Compile ID would preferably be a global constant generated for each application by one or more processes during the qualification process for the particular applet. After it is generated by a particular ThIM 200 on a unique portable communication device 100, the Compile token is included or otherwise associated with the application/applet on the portable electronic device. This Compile token is preferably generated by a pseudo-random number generator local to the device that uses a predetermined seed, such as the Application ID, Compile ID, Issuer ID or some combination thereof.

When an applet requires verification, its Compile ID (a digital token) and Application ID (a digital identifier) may be matched against the Compile ID and Application ID pairs stored on the portable communication device. As should be understood by those skilled in the art having the present specification before them, the same Compile and Application ID pairs are transmitted to (or in some instances pre-stored within) other devices associated with the system, as well. If the Compile ID/Application ID pair matches one of the pair-stored in ThIM on that particular device, a Secret Token ID is preferably generated on the device by a pseudo-random number generator (such as the one associated with the secure element or TEE) and then stored in association with the Compile ID/Application ID pair in the Card Services Registry in other device memory 160 on the portable communication device 100. In some instances, the Compile ID may be pre-selected and used to seed the random number generator. It should be understood that one or more pieces of other predetermined data associated with the device, ThIM, or some other agreed upon standard could be preselected as the seed instead. The Secret Token ID is also embedded in or otherwise associated with the applet on the portable communication device 100 in place of the Compile ID that was distributed with the application.

Figure 2:
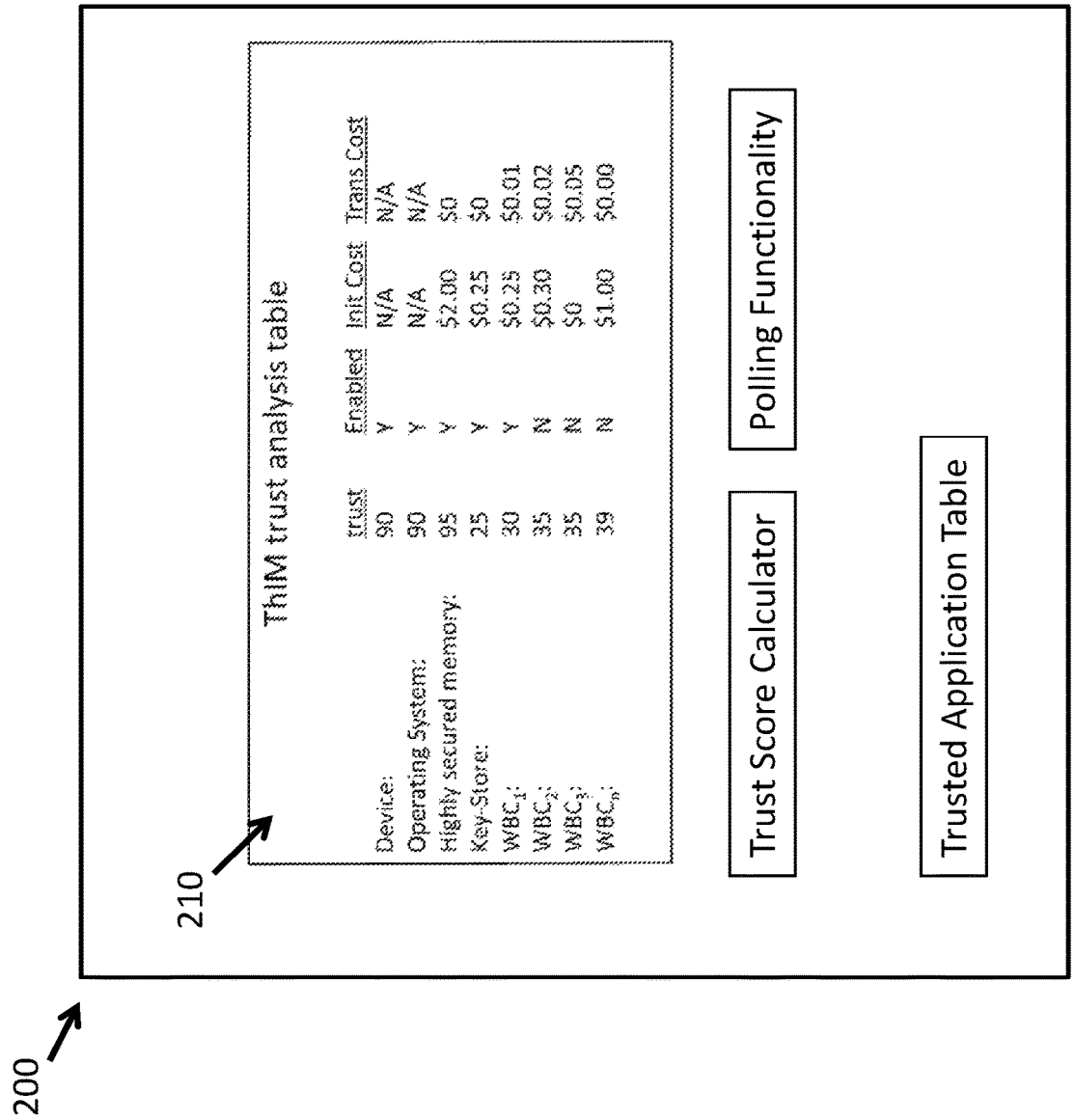
FIG. 2 is a schematic plan view of the functionality and data associated with the ThIM 200.

In one preferred approach of the present system, the ThIM 200 is capable of polling the operating system, the highly secure memory 150, each of the trusted applets, and other hardware, drivers and software to determine the manufacturer, version, the setting of available operating parameters and any other information that may be relevant in determining the relative security of each aspect of the portable electronic device 100 as an element of a secure ecosystem. As shown in FIG. 2, the database will further contain at least a trust number, for instance, between zero (no trust) and one-hundred 100 (highest trust) that indicates the relative trustworthiness of each component (e.g. hardware and software elements of the portable electronic device 100) and may also potentially include the information obtained and/or generated as a result of the polling conducted by the ThIM 200, upon which that trust number was based. For instance, the ThIM 200 may first recognize the existence of a SE within the portable device 100 environment in which ThIM 200 been deployed. Because it is a secure element, the trust score will likely be very high (e.g. 95-100), at least as long as the SE is running the most current stack that has been recommended for that SE by the SE's manufacturer. Especially this last aspect of the trust rating will likely be determined mostly in communication with the Trust Authority System 300.

In another example, the ThIM 200 may recognize the presence of a TEE within the portable device 100. Here because it is a TEE, rather than a secure element, its trust score will likely be high (e.g. 70-75) so long as the TEE is running the most current firmware recommended by the TEE's manufacturer, but not as high as the trust score for a properly configured SE. For example, the ThiM may determine that the portable device, itself, is an Samsung® Galaxy® S6 (Model # SM-G925V) smartphone with a Samsung® Exynos 7 Octa 7420 chip running Android® 6.0 ("Marshmallow"). By communicating with the backend, the ThIM 200 may determine that this particular configuration of the SM-G925V is a relatively safe environment within which to keep digital secrets (as opposed to the Android® 5.1.1 OS deployed by Samsung which reportedly contained a variety of security problems that allowed the phone to be remotely hacked. That ranking would be reflected by writing an appropriate trust number for the equipment in the database operably associated with the ThIM 200. This database may be internal to the ThIM 200, deployed elsewhere on the portable electronic device 100 or even deployed in the cloud. Of course, depending upon the location of the deployment certain security provisions may have to be made to ensure the integrity of the system.

Returning to the example of a portable communication device having a secure element as its highly secured memory, as illustrated in FIG. 2, activation of that secure element may result in the demand for a one-time initialization fee. In the example illustrated in FIG. 2, this initialization fee is $2.00. As would be understood that initial fee could be any amount that would be likely set primarily by the distributor and/or manufacturer of the highly secured memory. When the fee is assessed, it may be paid electronically, for example, to the SE manufacturer or the portable device manufacturer to allow recoupment of the cost of deploying a SE in the first instance. It is also contemplated that the charges may be paid by the end user of the portable communication device 100 by requiring the end user to establish an account with the Trust Authority system 300 prior to initializing the portable communication device 100. It is more likely, though, that the system would charge the third party application owners for their use of the secure resource. To be more specific, if a bank wants to deploy a wallet application on the portable communication device 100 it may want/need to activate the SE on that device. Because the bank will ultimately reap the benefit of the end user's ready access to their electronic wallet software, it makes logical sense to charge the bank for the initiation of the SE. As further illustrated in FIG. 2, it is also contemplated that the highly secured memory could have an associated transaction cost (e.g. per use, per time period, etc.). This approach may be particularly desirable in situations where multiple credentials and other digital secrets will all benefit from the initialization and use of the highly secured memory. In that case, pricing the use of the memory on a per transaction basis allows each direct beneficiary of the existence of the highly secured memory to share in the cost of having the highly secured memory available for use by their applet. It is further contemplated that the transaction charges associated with the highly secured memory (or any other element of the security ecosystem track by the ThIM trust analysis table 210) could be capped at a certain maximum value.

The trusted applets in most instances will include a key store (such as Android KeyStore or iOS KeyStore) and one or more whitebox cryptography programs (such as Arxan WBC and White-Box AES project). As illustrated in FIG. 2, as with the device, operating system, and highly secured memory, each of these applets will be assigned a trust score by the ThIM 200. That trust score will be saved in the ThIM trust analysis table 210. Furthermore, each of the applets may have one or both of an associated initialization cost and a per transaction cost, and there may also be a maximum total charged value. Here, the potential permutations are endless and will be market driven. For example, the strongest type of Whitebox Encryption (WBC) is likely to cost the most money. It is possible that the developer of such a WBC may decide it prefers to recoup a fixed cost up-front and nothing more for the incremental uses (see, e.g. WBCn in database 210) or the developer may decide to recoup their costs based on a per-use model (see WBC3). In each instance, the third party applications may be paying for the usage of these applets and may decide which applet to use depending upon the trust score of the applet versus its cost of use. For illustration purposes in the example illustrated in FIG. 2, $WBC_n$ was assigned a trust score of 39 and has an initiation cost of $1.00 and a transaction cost of $0.00, while $WBC_3$ was assigned a trust score of 35 and has $0 initiation cost, but a per transaction cost of $0.05.

For a third party application that is rarely used and not super-concerned about high-level security, a four point difference in trust score to avoid a $1.00 initiation cost may be worth the savings. In such an instance, the third party application could choose to use $WBC_3$ as its cryptographic applet.

The particular values of trust in the database 210 may be based on third party rankings or other reports regarding the security, operation, power consumption, and other variables associated with the various components. The trust values may be established and/or revised periodically. And they may be published periodically by the Trust Authority or some entity on behalf of the Trust Authority. These values may be stored in the first instance in the cloud (in association with the trusted authority system 300) and then pulled down to the local database 210 associated with the ThIM 200 in a particular portable communication device 100 following polling of the device by the ThIM. These trust values may be based on third party rankings or other reports regarding the security, operation, power consumption, and other variables associated with the various components. The values may be established and/or revised periodically and they may be published periodically by the Trust Authority or someone on behalf of the Trust Authority. The values may also be pushed out to various ThIMs, especially if the trust number for a particular device has dropped significantly.

The ThIM's polling of the various elements that exist in the secure ecosystem may be accomplished by functionality associated with the ThIM 200 for interrogating the device to find out if the device 100 is real or perhaps even a rogue device. For example, the ThIM 200 may be equipped with the capability to write data to an SE and/or TEE on the device 100 and then read that data in both its encrypted and unencrypted forms to judge whether the SE/TEE is real. Similar functionality may be deployed in association with the ThIM 200 for testing other components within the device to judge whether or not those components are what they say they are.

Ultimately one or more third party applications that utilizes a master key to provide the end user with services will attempt to register with the ThIM 200 such that is can use a master key stored in the highly secured memory 150 in the portable electronic device 100. These third party applications may provide for electronic payment, transit access, electronic access (potentially including biometric security), and the like. First, each third party application must be trusted by the ThIM in the manner discussed above. After the third party application or applet has been trusted by the ThIM (with its appropriate secret token embedded in the application and stored in a database associated with ThIM), the ThIM 200 may determine how the third party application is intended by its owner/author to interact with the secure ecosystem. So, for example, let's say that owner of third party $app_2$ is Bank of Amazonia and that Bank of Amazonia is very risk averse. For that application Bank of Amazonia would program its applet not to operate on the device 100 if the device cannot provide a composite trust score equal to or greater than 90-90-95-20-35. It is presently believed that the composite trust score will be an array of the trust values for each of the:

device-operating system-highly secured memory-keystore-WBC taken individually. However, it may be possible that the individual values could be mathematically aggregated into a single value to reflect the overall environmental security (i.e. 90+90+95+20+35=330). In our present example, the device only has $WBC_1$ enabled (which is illustrated in FIG. 2 as having only a trust score of 30), then the third party application provider may not want its application to operate on the device 100. In such case, an error message could be generated and sent to at least the Trust Authority system 300, preferably with sufficient information contained in the message so that the system 300 can determine the reason for the error. In another example, another third party application may allow the application to perform certain tasks (e.g. reading the highly secure memory) but not other tasks (such as writing or emulating a credential in certain circumstances) depending upon the trust score of each of the elements. Similarly, the third party application may be programmed to bare certain costs for the availability of certain components. So, continuing with the example, the application could look at the disabled WBC options available in the device and based on the business and security philosophy of the owner of the third party application, the application may enable one of $WBC_2$, $WBC_3$ or $WBC_n$ to achieve an increased trust score with the whitebox cryptography used with the application. In each case, the trust score of $WBC_2$, $WBC_3$ and $WBC_n$ is equal to or exceeds the minimum trust score of 35 (desired by the hypothetical third party application), however, the pricing associated with initializing each application is different as is the per transaction cost. For an application that will be used often, it is contemplated that the developer could skew toward lower per transaction costs. It is also contemplated that the application could be programmed to switch between enabled WBC applets depending upon the type of transaction being undertaken.

It is also contemplated that a third party application could use a weighted aggregate trust score. The third party application owner could decide that nothing is more important than having a highly secure device with an appropriate operating system, but that the highly secured memory could be a TEE (e.g., trust score of 75; instead of the 95 score shown in the illustration of FIG. 2). In such a case, the third party application owner could provide a weighting function that makes the score of the device and OS paramount (e.g. 90*10+90*10+75*1+20*5+35*5=2150; where the device and OS trust score accounts for nearly 84% of the overall trust score). As one of ordinary skill in the art having the present disclosure before them would now perceive, by altering the weighting function and the minimum aggregate trust score, an application owner can manipulate the minimum security environment within which the application operates.

It is also contemplated that the application owner could modify the operation of the product to minimize the risk in response to a more risky environment. So, continuing with our hypothetical example, if the application does not want to pay for more trusted WBC applets, it could instead stick with the WBC rated with a trust score of 30 but limit the transactions that can be supported by the application to a less risky operation. For example, the credit limit on a card could be lowered to $500 from $10,000 for purposes of use via the portable communication device. In another example, the third party application could set up a payment as a debit card transaction instead of a credit transaction to minimize the risk of a fraudulent transaction to the issuer. It is finally contemplated that if a third party application cannot get the trust score it desires on the device, that the system could allow the application to not store keys on the device at all, but rather serve one-time keys from Trust Authority system 300 to the mobile communication device 100, instead.

Once the third party application determines the functionality it may deploy in association with the particular device, the application may launch and prompt the end user to opt-in to provide access to the issuer-specific credential(s) needed for (or otherwise desired for use with) the now validated (or trusted) application. In each subsequent launch of the trusted applets, the embedded Secret Token and/or Application ID are compared to the data in ThIM on the device. If there is match, the application is trusted and can access the SE or TEE via ThIM. In this manner, it can be seen that the Secret Token and/or Application ID associated with any of the applets may also be removed from ThIM causing it to be disabled from accessing SE or TEE. Similarly, if any applet is tampered with the Secret Token and/or Application ID will be invalidated. The database associated with ThIM would preferably be protected by encrypting the table using, for example, a security algorithm (e.g., advance encryption standard (AES) algorithm, the secure hash algorithm (SHA), message digest 5 (MD5) algorithm, and the like) with a key value that is a hash generated from one or more parameters (e.g., a secure element ID, passcode, etc.) as inputs. If a rogue application tampers with ThIM, for instance, ThIM would detect the change and replace the permission table with one retrieved from the secure element management server.

ThIM also preferably uses the trusted application verification step to determine the appropriate level of subsystem access allowed for each applet. For example, in one embodiment, one applet may be authorized to access and display all of the data contained in the payment subsystem, where another applet may be only authorized to access and display a subset of the data contained in the payment subsystem. In one approach, assignment of permissions to the application can be thought of as follows:

|  | Reserved | All Credentials | Extended Issuer Credentials | Own Credentials |
| --- | --- | --- | --- | --- |
| Read | 0 | 0 or 1 | 0 or 1 | 0 or 1 |
| Write | 0 | 0 or 1 | 0 or 1 | 0 or 1 |
| Delete | 0 | 0 or 1 | 0 or 1 | 0 or 1 |
| Activate/Deactivate | 0 | 0 or 1 | 0 or 1 | 0 or 1 |
| Download Credential | 0 | 0 or 1 | 0 or 1 | 0 or 1 |

These permissions can be used to form a hexadecimal number in the order shown above from most to least significant figure. For example an application can have a permission level of 11111, which can be thought to expand to 0001 0001 0001 0001 0001. In other words, this application can read, write, delete, activate/deactivate, and download its own credentials but not the extended issuer credentials let alone all credentials. If the provider has another issuer code, then that would be an extended Issuer application. So, if the permission level of the application associated with Issuer ID was set to 0010 0001 0001 0010 0001 (or 21121hex) then the application would be able to read and activate/deactivate the credentials associated with both issuer IDs. As would be understood by those of ordinary skill in the art, these are merely examples of potential permissions that can be granted to applets, other permissions are contemplated. For instance, some applets may have the ability to read extended issuer credentials, but only write, delete, activate and download the application's own credentials (e.g., 21111, which expands to 0010 0001 0001 0001 0001). In yet another example, an application may only be given activate/deactivate and download rights (e.g., 0000 0000 0000 0001 0001 or 00011 in hexadecimal). In yet another example, an application may be disabled—without being deleted from the trusted application database or Card Service Registry—by setting all rights to zero.

For example, when an applet needs to interact with the SE or TEE it could pass a digital identifier (such as its Issuer ID or App ID), a digital token (i.e., Compile ID or Secret Token ID), the desired action, and any associated arguments needed for the action to ThIM. ThIM verifies the digital identifier-digital token pair matches trusted application data in the secure data table, and then ThIM would issue the one or more commands to the SE or TEE necessary to execute the action requested by the applet. Among the potential actions that may be used by the applet are those associated with:

a. wallet management (e.g., setting, resetting or enabling wallet passcodes; get URL of OTA server; over-the-air registry provisioning; setting payment timing; increasing payment timing; set default card; list issuers, list supported credentials; set display sequence of credentials; set credential storage priority; create categories/folders; associate credentials with categories; memory audit; determine Secure Element (SE) for storage of credential; get Offers; update wallet status);

b. credential management (e.g., add credential; view credential detail; delete credential; activate credential (for redemption/payment); deactivate credential; search credentials; list credential capability; set default credential; lock/unlock credential; require passcode access; get credential image; set access passcode);

c. Highly Secure Memory (SE/TEE) Management (e.g., create security domains for issuers; rotate keys; load applications; update applications; wallet lock/unlock; SE lock/unlock);

d. Personalization (e.g., add credential; delete credential; suspend/unsuspend credential; notification for issuer metadata update; notification for card metadata update).

The foregoing description and drawings merely explain and illustrate the invention and the invention is not limited thereto. While the specification is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. To those skilled in the art, the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

What is claimed is:

1. A system for generation, storage, administration and use of one or more digital secrets in association with a portable electronic device, the system compromising:
   a highly secured memory in the portable electronic device, storing only one or more issuer keys;
   an other device memory in the portable electronic device which is distinct from the highly secured memory and is not comprised of either a physical secure element or a microprocessor with a trusted execution environment;
   a keystore implemented in the portable electronic device outside of the highly secured memory in the other device memory;
   one or more cryptography applets implemented in the portable electronic device outside of the highly secured memory in the other device memory; and
   a trusted intermediary module (ThIM) implemented outside of the highly secured memory in the portable electronic device, the ThIM establishes and manages a trusted secured communication conduit between the highly secured memory, the keystore, the one or more cryptography applets, and at least one third party application, wherein the ThIM polls the portable electronic device, the highly secured memory, the keystore, the one or more cryptography applets to determine a trust score, initialization cost, and transaction cost for each component in the portable electronic device, the ThIM providing a trusted third party application acceptable interaction parameters based on the trust score, the initialization cost, and the transaction cost, the ThIM managing trusted communications between the trusted third party application and the highly secured memory in accordance with the acceptable interaction parameters;
   wherein each of the one or more issuer keys comprises a cryptographic key provided for use by said at least one third party application.

2. The system of claim 1, wherein the highly secured memory is selected from the group consisting of a physical secure element and a microprocessor with a trusted execution environment.

3. A system for generation, storage, administration and use of one or more digital secrets in association with a portable electronic device, the system compromising:

a highly secured memory in the portable electronic device, storing only one or more issuer keys;

an other device memory in the portable electronic device which is distinct from the highly secured memory and is not comprised of either a physical secure element or a microprocessor with a trusted execution environment;

a keystore implemented in the portable electronic device outside of the highly secured memory in the other device memory;

one or more cryptography applets implemented in the portable electronic device outside of the highly secured memory in the other device memory; and a trusted intermediary module (ThIM) implemented outside of the highly secured memory in the portable electronic device, the ThIM establishes and manages a trusted communication conduit between the highly secured memory, the keystore, the one or more cryptography applets, and at least one third party application, wherein the ThIM polls the portable electronic device, the highly secured memory, the keystore, the one or more cryptography applets to determine a trust score for each component, the ThIM allowing a trusted third party application to determine acceptable interaction parameters based on the trust score, the ThIM managing trusted communications between the trusted third party application and the highly secured memory in accordance with the acceptable interaction parameters;

wherein each of the one or more issuer keys comprises a cryptographic key provided for use by said at least one third party application.

4. The system on claim 3 wherein the acceptable interaction parameters may further include unique data provided by the trusted third party application to the ThIM.

5. The system of claim 3, wherein the highly secured memory is selected from the group consisting of a physical secure element and a microprocessor with a trusted execution environment.

6. A system for generation, storage, administration and use of one or more digital secrets implemented within a portable electronic device, the system compromising:

a highly secured memory in the portable electronic device, storing only one or more issuer keys;

an other device memory in the portable electronic device which is distinct from the highly secured memory and is not comprised of either a physical secure element or a microprocessor with a trusted execution environment;

a keystore implemented in the portable electronic device outside of the highly secured memory in the other device memory;

one or more cryptography applets implemented in the portable electronic device outside of the highly secured memory in the other device memory; and a trusted intermediary module (ThIM) implemented outside of the highly secured memory in the portable electronic device;

wherein the ThIM establishes and manages a trusted secured communication conduit between the highly secured memory, the keystore, the one or more cryptography applets, and at least one third party application; and wherein each of the one or more issuer keys comprises a cryptographic key provided for use by said at least one third party application.

7. The system of claim 6, wherein the highly secured memory is selected from the group consisting of a physical secure element and a microprocessor with a trusted execution environment.

\* \* \* \* \*